United States Patent
Nielsen et al.

(10) Patent No.: US 12,475,806 B2
(45) Date of Patent: Nov. 18, 2025

(54) FLIGHT MANAGEMENT SYSTEM DEPARTURE AND ARRIVAL PERFORMANCE DISPLAY BASED ON WEATHER DATA UPLINK

(71) Applicant: Rockwell Collins, Inc., Cedar Rapids, IA (US)

(72) Inventors: Michael J. Nielsen, North Liberty, IA (US); Bradley R. Thompson, Cedar Rapids, IA (US); Ricky M. Kannothra, Marion, IA (US); Carlo L Tiana, Portland, OR (US); Robert B. Wood, Beaverton, OR (US); David L. Flanders, Tigard, OR (US); Lu Bai, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 643 days.

(21) Appl. No.: 17/473,295

(22) Filed: Sep. 13, 2021

(65) Prior Publication Data
US 2021/0407306 A1 Dec. 30, 2021

Related U.S. Application Data

(63) Continuation-in-part of application No. 15/257,886, filed on Sep. 6, 2016, now abandoned, and a
(Continued)

(51) Int. Cl.
*G01W 1/02* (2006.01)
*G01S 13/90* (2006.01)
(Continued)

(52) U.S. Cl.
CPC ............ *G08G 5/76* (2025.01); *G01S 13/9047* (2019.05); *G01S 13/953* (2013.01); *G01W 1/02* (2013.01);
(Continued)

(58) Field of Classification Search
CPC .. G08G 5/0091; G08G 5/0013; G08G 5/0021; G08G 5/003; G08G 5/025;
(Continued)

(56) References Cited

U.S. PATENT DOCUMENTS 2,697,828 A 12/1954 Heintz
3,243,816 A 3/1966 Chisholm
(Continued)

OTHER PUBLICATIONS

Rockwell Collins WXR-2100 Weather Radar System, http://www.rockwellcollins.com/ecat/at/WXR-2100_PrintFriendly.html, Downloaded May 17, 2006, 9 pages.
(Continued)

*Primary Examiner* — Abby Lin
*Assistant Examiner* — Renee LaRose
(74) *Attorney, Agent, or Firm* — Suiter Swantz IP

(57) ABSTRACT

A flight management system includes a communications system configured to receive weather data from a remote source, a display system configured to generate an output for a flight display of an aircraft, and at least one processor with a non-transitory processor-readable medium storing processor-executable code. The output includes weather information based on the received weather data. The processor-executable code causes the processor to receive a user input from a user interface element of the aircraft where the user input requests updated weather information. The processor-executable code causes the processor to retrieve, via the communications system and in response to the user input, updated weather data from the remote source; calculate a departure or arrival performance flight parameter based at least in part on the updated weather data; and provide, via the display system, an output for the flight display of the aircraft where the output includes the flight parameter.

8 Claims, 13 Drawing Sheets

Related U.S. Application Data continuation-in-part of application No. 14/715,397, filed on May 18, 2015, now Pat. No. 11,142,340.

(51) Int. Cl.
| | |
|---|---|
| *G01S 13/95* | (2006.01) |
| *G06F 3/0488* | (2022.01) |
| *G08G 5/21* | (2025.01) |
| *G08G 5/26* | (2025.01) |
| *G08G 5/30* | (2025.01) |
| *G08G 5/54* | (2025.01) |
| *G08G 5/76* | (2025.01) |

(52) U.S. Cl.
CPC ............. *G06F 3/0488* (2013.01); *G08G 5/21* (2025.01); *G08G 5/26* (2025.01); *G08G 5/30* (2025.01); *G08G 5/54* (2025.01)

(58) Field of Classification Search
CPC .... G01S 13/9047; G01S 13/953; G01W 1/02; G06F 3/0488
See application file for complete search history.

(56) References Cited

U.S. PATENT DOCUMENTS

| | | | |
|---|---|---|---|
| 4,210,930 A | 7/1980 | Henry | |
| 5,208,601 A * | 5/1993 | Hart ..................... | G01S 13/913 |
| | | | 342/7 |
| 5,459,468 A | 10/1995 | Hartal | |
| 7,192,155 B2 | 3/2007 | Morrow et al. | |
| 7,889,117 B1 | 2/2011 | Woodell et al. | |
| 8,077,078 B1 | 12/2011 | Woodell et al. | |
| 8,576,113 B1 | 11/2013 | Seah et al. | |
| 8,576,131 B2 | 11/2013 | Szopko et al. | |
| 8,643,533 B1 | 2/2014 | Woodell et al. | |
| 8,977,491 B1 | 3/2015 | McCusker et al. | |
| 9,024,805 B1 | 5/2015 | Jinkins et al. | |
| 9,384,586 B1 | 7/2016 | McCusker et al. | |
| 9,558,674 B2 | 1/2017 | He | |
| 9,562,788 B1 | 2/2017 | Jinkins et al. | |
| 9,733,349 B1 | 8/2017 | Wood et al. | |
| 9,939,526 B2 | 4/2018 | Jinkins et al. | |
| 2002/0105432 A1 | 8/2002 | Pederson et al. | |
| 2004/0183695 A1* | 9/2004 | Ruokangas .......... | G08G 5/0091 |
| | | | 455/414.3 |
| 2010/0149639 A1 | 6/2010 | Kim | |
| 2012/0147030 A1* | 6/2012 | Hankers ............... | G09B 29/006 |
| | | | 345/619 |
| 2013/0046422 A1* | 2/2013 | Cabos .................. | G08G 5/0021 |
| | | | 701/120 |
| 2013/0090841 A1* | 4/2013 | Barraci ................. | G08G 5/025 |
| | | | 701/120 |
| 2014/0039734 A1* | 2/2014 | Ramaiah .............. | G08G 5/0091 |
| | | | 701/14 |
| 2014/0375796 A1 | 12/2014 | Cam et al. | |
| 2015/0362920 A1* | 12/2015 | McGregor ............ | G08G 5/26 |
| | | | 701/15 |
| 2016/0057032 A1* | 2/2016 | Tieftrunk ............. | G08G 5/0026 |
| | | | 709/224 |
| 2016/0093222 A1* | 3/2016 | Hale ...................... | G08G 5/34 |
| | | | 701/120 |
| 2018/0238996 A1* | 8/2018 | Gurusamy ........... | G08G 5/0052 |

OTHER PUBLICATIONS

Washington, John Croft, "Radar Diversity Rockwell Collins tests radar as a runway-finder", Aviation Week & Space Technology, Jan. 15-Feb. 1, 2015, p. 61, AviationWeek.com/awst.

* cited by examiner

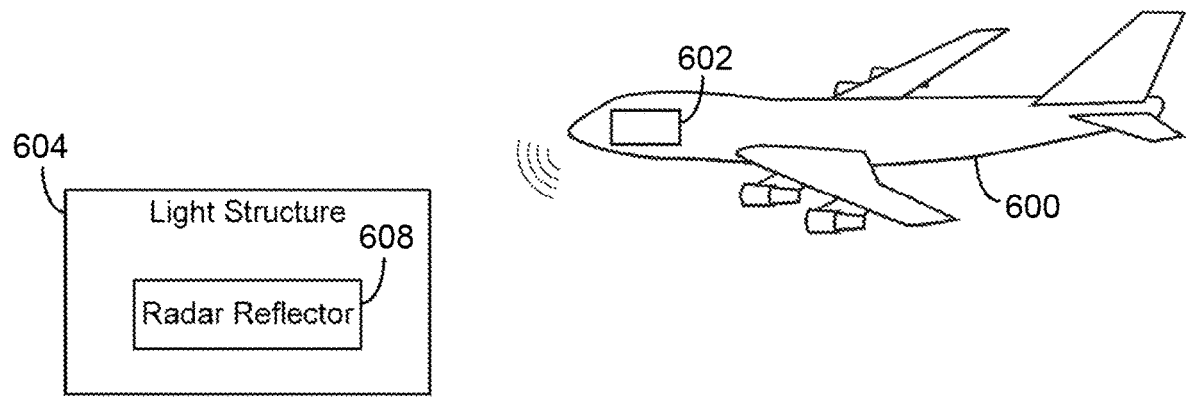
FIG. 6
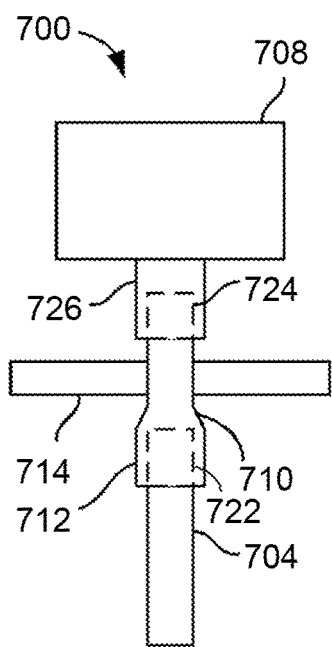 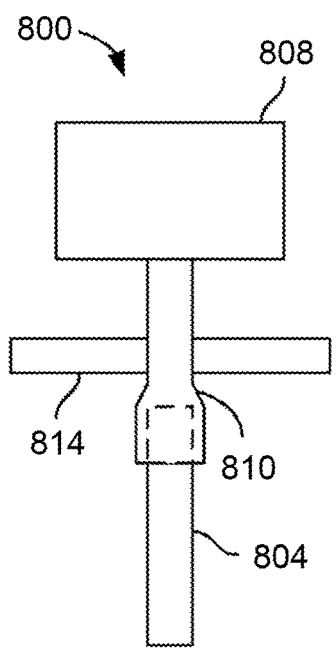 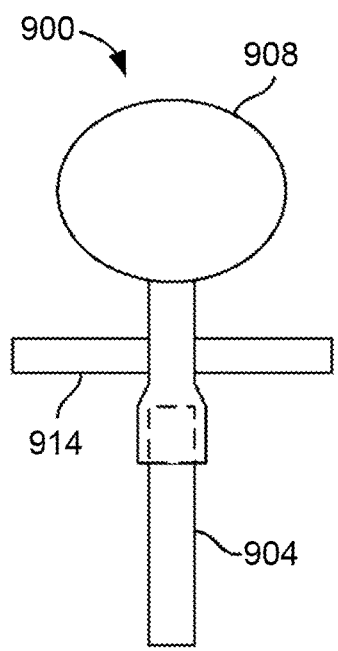
FIG. 7  FIG. 8  FIG. 9

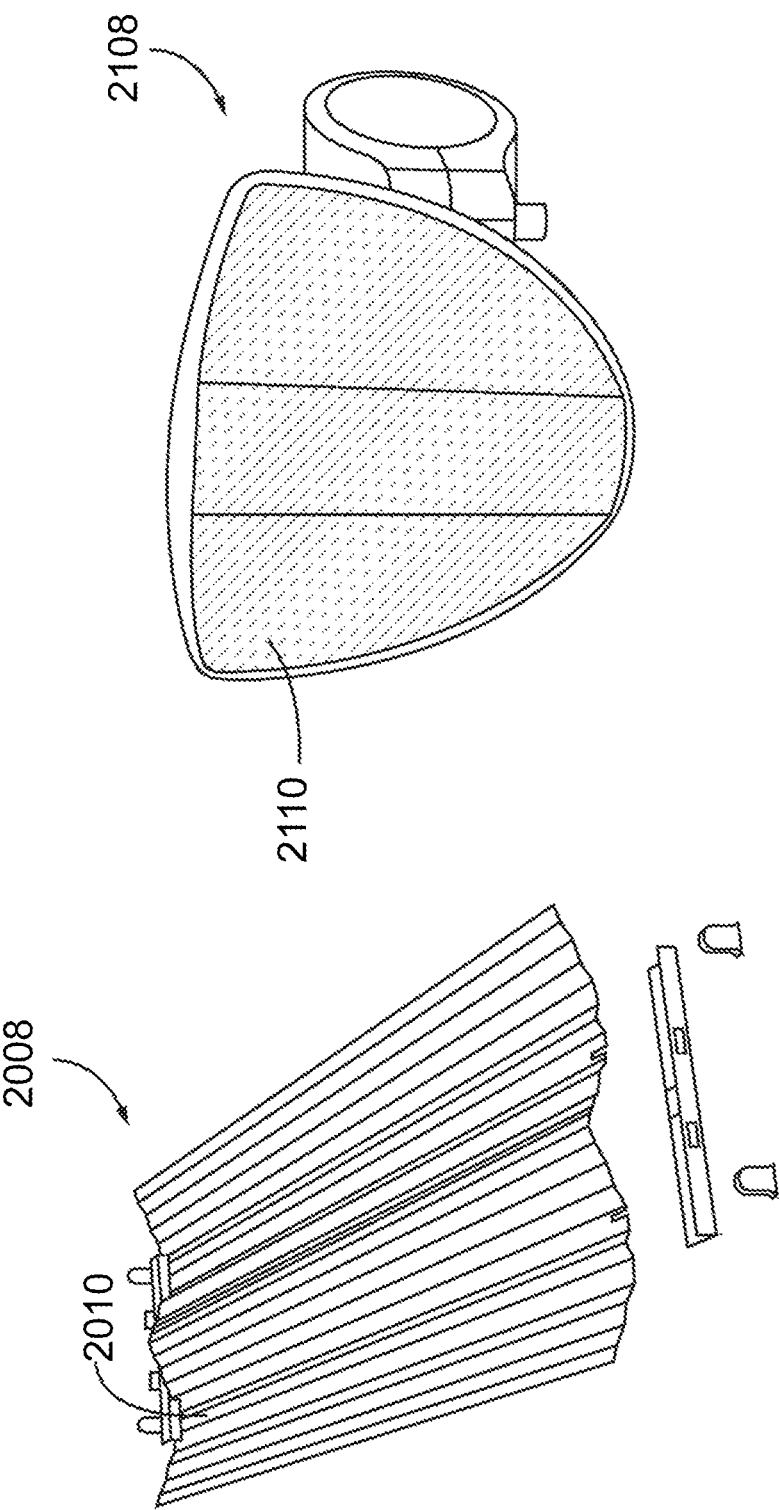

2200
2214
FIG. 22A
↓
Receiving a user input comprising a touch on the touchscreen, the user input relating to a request for the updated weather data
FIG. 22B
2200
2216
FIG. 22A
↓
Causing an alert to be displayed on the flight display in response to the age of the weather data meeting or exceeding the threshold, the alert indicating the age of the weather data
FIG. 22C

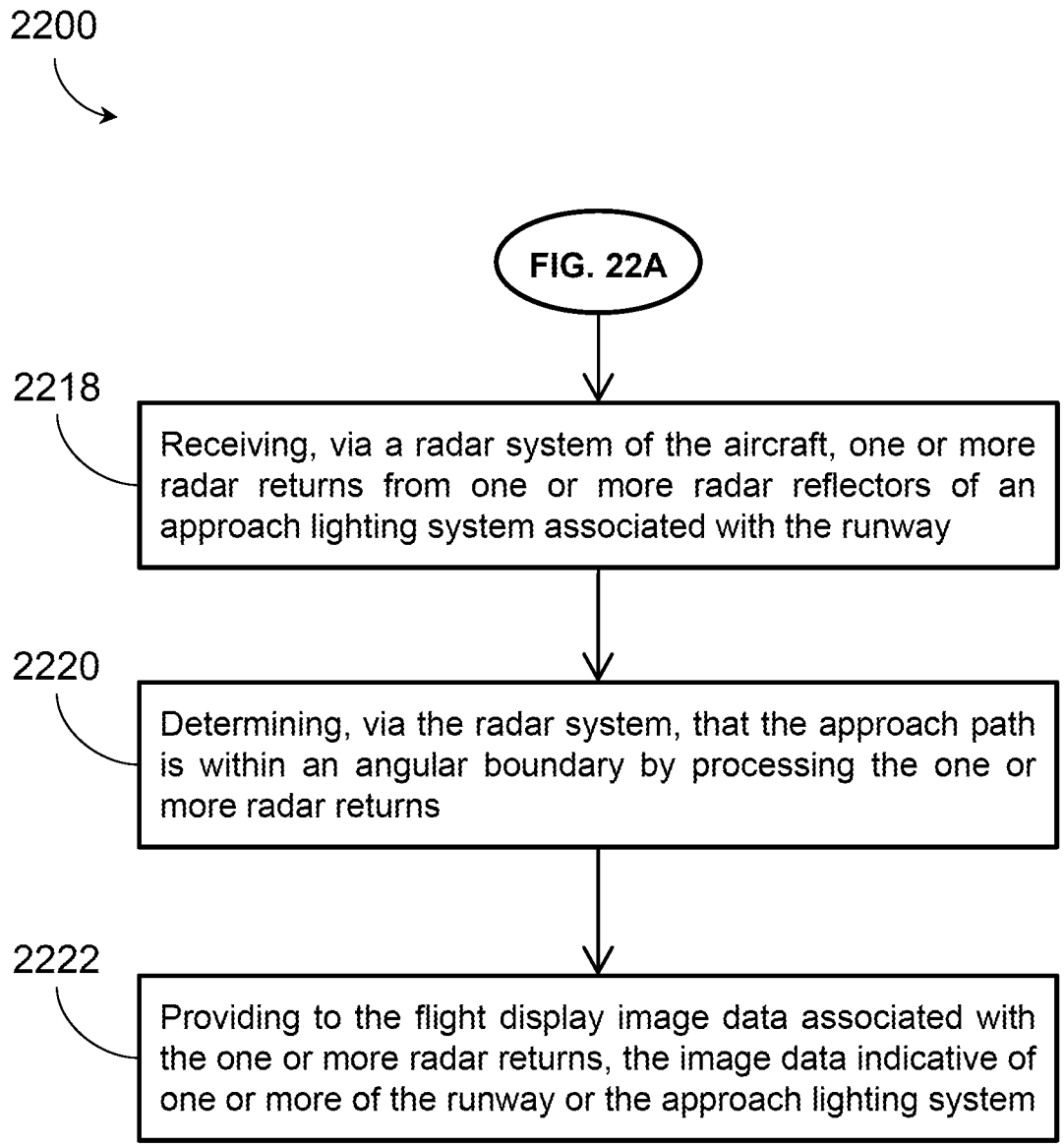

FLIGHT MANAGEMENT SYSTEM DEPARTURE AND ARRIVAL PERFORMANCE DISPLAY BASED ON WEATHER DATA UPLINK

CROSS-REFERENCE TO RELATED APPLICATIONS

The present application claims priority under 35 U.S.C. § 120 as a continuation-in-part of co-pending U.S. patent application Ser. No. 14/715,397, filed May 18, 2015, and entitled SYSTEM AND METHOD FOR RADAR SENSING RUNWAY APPROACH AND TAXI LIGHTS.

The present application additionally claims priority, on a provisional basis, under 35 U.S.C. § 120 as a continuation-in-part of U.S. patent application Ser. No. 15/257,886, filed Sep. 6, 2016, and entitled FLIGHT MANAGEMENT SYSTEM DEPARTURE AND ARRIVAL PERFORMANCE DISPLAY BASED ON WEATHER DATA UPLINK, which application is abandoned as of Jan. 30, 2019.

Said U.S. patent application Ser. Nos. 15/257,886 and 14/715,397 are herein incorporated by reference in their entirety, the latter on a provisional basis as indicated above.

TECHNICAL FIELD

The inventive concepts disclosed herein relate to sensing terrain features using electromagnetic energy including but not limited to electromagnetic energy associated with an avionic weather radar system.

Further, the inventive concepts disclosed herein relate generally to providing information to assist with a takeoff and landing of aircraft. More particularly, embodiments of the inventive concepts disclosed herein relate to receiving and notifying an aircraft operator of weather information relevant to the takeoff and landing process.

BACKGROUND

An aircraft uses a vision system, such as, an enhanced vision system (EVS), to provide imagery to an aircraft crew. The imagery can include an airport terminal area and runway environment when meteorological or lighting conditions prevent a clear natural view of the external surroundings of the aircraft through the windscreen. For example, the EVS may overlay an image of an airport terminal area and runway environment over the pilot's natural unaided view of the external surroundings of the aircraft through the aircraft's cockpit windscreen via a head up display (HUD). Such imagery can improve the situational awareness of the flight crew during instrument approach procedures in low visibility conditions such as fog.

An EVS typically uses either a passive or active sensing system to acquire data used to generate imagery of the airport terminal area and runway environment. A typical passive sensor, such as, a forward looking infrared (FLIR) camera or visible light spectrum camera, receives electromagnetic energy from the environment and outputs data that may be used by the system to generate video images from the point of view of the camera. The camera is installed in an appropriate position, such as in the nose of an aircraft, so that the pilot can be presented with an appropriately scaled and positioned video image on the HUD having nearly the same point of view as the pilot when viewing the external surroundings of the aircraft through the HUD. However, while passive sensors provide higher quality video imagery, the passive sensors are often unable to identify required visual references in certain low visibility conditions, such as, heavy fog.

Active sensing systems, such as, millimeter wavelength (MMW) (e.g., 94 GHz) and weather radar systems (e.g., X-band or C-band), transmit electromagnetic energy into the environment and receive return electromagnetic energy reflected from the environment. The active sensing system is typically installed in an appropriate position, such as in the nose of an aircraft. Active sensing systems can have difficulty accurately identifying runway structures and positions of those structures.

Further, a flight management system (FMS) of the aircraft may, among other things, assist the pilot or operator during a departure or an arrival sequence. The FMS may generally calculate various performance related parameters relevant to the takeoff and landing of the aircraft, such as a takeoff distance, takeoff V-speed, a landing distance, and landing V-speeds. The FMS may use weather conditions to adjust the various parameters relevant to takeoff and landing. FMS typically require pilots to manually input weather data into, for example after the pilot listens to a weather broadcast over a VHF radio channel, which may lead to incorrect information being entered and used by the FMS when determining departure and arrival parameters.

Thus, there is a need for a system for and method of augmenting the ability of a radar system to sense runway structures. Further, there is a need for systems for and methods of providing low-cost runway structures that can be sensed by radar. There is also a need for display systems for and methods of providing images of derived from radar data associated with runway structures. There is still a further need for systems for and methods of providing images of the runway environment derived from weather radar data where such images enable operation below certain specified altitudes during instrument approaches. Further still, there is a need for systems and methods that sense lighting structures using X-band and C-band radar data. Yet further still, there is a need for runway lights that are configured to be sensed by a radar system. Yet further still, there is a need for providing visual approach slope indications (VASI) or precision approach path indications (PAPI) without using lighting.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In one aspect, the inventive concepts disclosed herein are directed to a flight management system. The flight management system includes a communications system, a display system, and at least one processor with a non-transitory processor-readable medium storing processor-executable code. The communications system is configured to receive weather data from a remote source. The display system is configured to generate an output for a flight display of the aircraft. The output at least partially comprises weather information based on the received weather data. The processor-executable code causes at least one processor to receive a user input from a user interface element of the aircraft, the user input requesting updated weather information; retrieve, via the communications system and in response to the user input, updated weather data from the remote source; calculate one or more flight parameters based at least in part on the updated weather data; and provide, via the display system, an output for the flight display of the aircraft, the output comprising the one or more flight parameters.

In a further aspect, the inventive concepts disclosed herein are directed to a method for assisting an aircraft in a landing process. The method includes generating a display presentable by an aircraft flight display, the aircraft on approach to or preparing to land on a runway, the display including weather information based on weather data received from a remote source via uplink. The method includes determining the age, e.g., the currency, of the received weather data. The method includes, if the weather data is sufficiently old (e.g., meets or exceeds an age threshold), retrieving current or updated weather data via the aircraft flight management system (FMS). The method includes determining, via the FMS, whether the runway is in a wet condition or a dry condition based on the updated weather data. The method includes calculating, based on the updated weather data and the runway condition, flight parameters associated with the approach path or the landing process. The method includes providing the calculated flight parameters to the flight display for presentation to the pilot.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings:

FIG. 4 is an example display illustrating flight parameters relevant to takeoff process according to the inventive concepts disclosed herein;

FIG. 5 is an example display illustrating flight parameters relevant to a landing process according to the inventive concepts disclosed herein;

FIG. 6 is a schematic general block diagram of a system for augmenting approach lighting detection according to some embodiments;

FIG. 7 is a planar side view schematic drawing of a runway light and radar reflector for use in the system illustrated in FIG. 6 according to some embodiments;

FIG. 8 is a planar side view schematic drawing of a runway light and radar reflector for use in the system illustrated in FIG. 6 according to some embodiments;

FIG. 9 is a planar side view schematic drawing of a runway light and radar reflector for use in the system illustrated in FIG. 6 according to some embodiments;

FIG. 20 is a perspective view schematic drawing of a radar reflector for use in the system illustrated in FIG. 6 according to some embodiments; and FIG. 21 is a perspective view schematic drawing of a radar reflector for use in the system illustrated in FIG. 6 according to some embodiments;

and FIGS. 22A through 22D are process flow diagrams illustrating a method for assisting an aircraft in a landing process.

DETAILED DESCRIPTION

Figure 1:
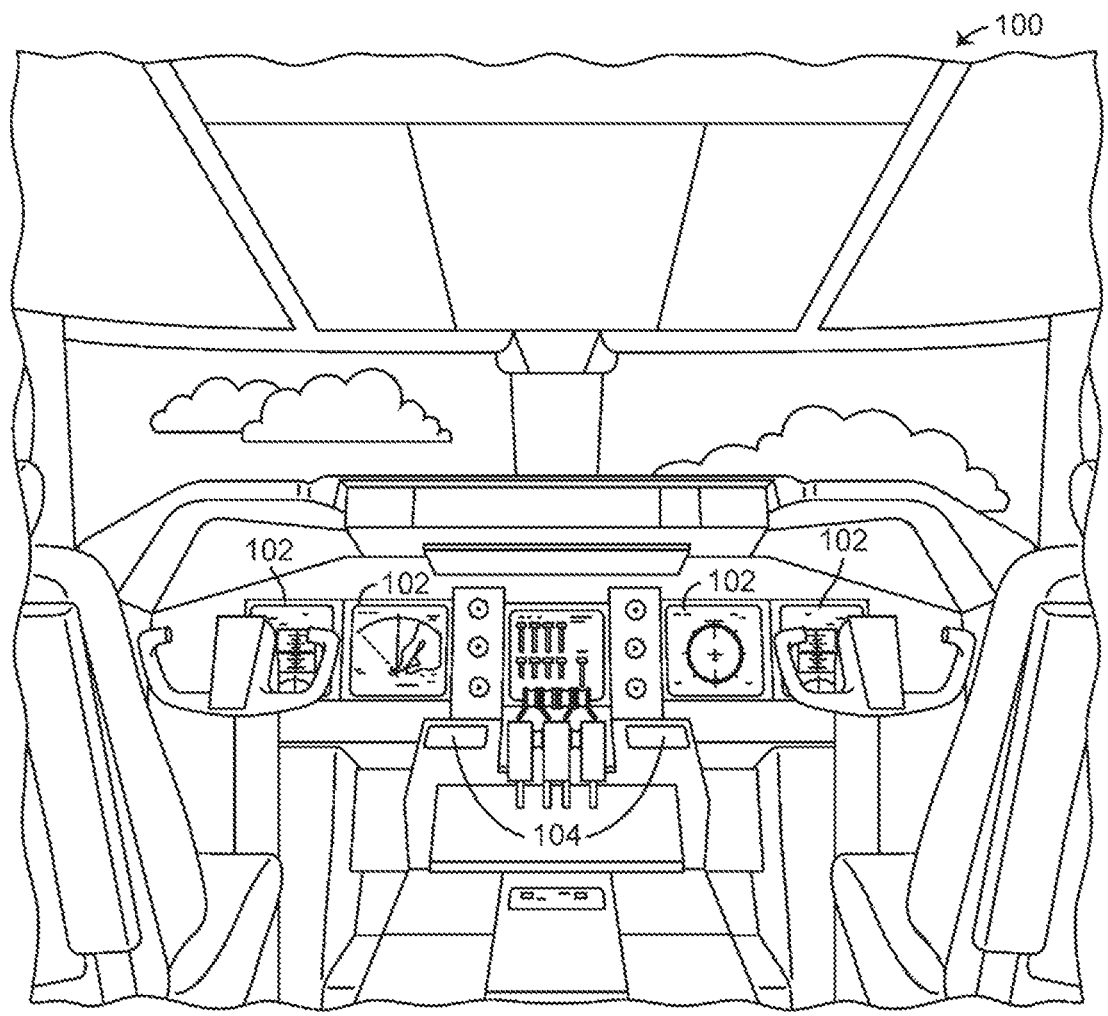
FIG. 1 is a schematic illustration of a control center of an aircraft including a display according to the inventive concepts disclosed herein.

Before describing in detail the inventive concepts disclosed herein, it should be observed that the inventive concepts disclosed herein include, but are not limited to, a novel structural combination of components, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Broadly, embodiments of the inventive concepts disclosed herein are directed to assisting a pilot and aircraft in an aircraft departure or arrival (e.g., a takeoff or landing) process. The inventive concepts disclosed herein can be utilized in a number of control systems for various types of applications, sensing systems, and display systems. While the present disclosure describes systems and methods implementable for providing assistance for an aircraft and particularly the pilot of the aircraft, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles or and objects. The inventive concepts disclosed herein could also be applied to autonomous operations. For example, an autonomous onboard computer could be configured to request and receive weather information and to determine takeoff and landing performance data used for autonomous flight operations.

Referring generally to the figures, systems and methods for providing one or more parameters for a departure or a landing of an aircraft are shown and described. More particularly, the systems and methods herein are configured to retrieve weather data and to modify departure or arrival flight parameters based on the weather conditions. In some embodiments, the weather data is retrieved from a remote source based on an input from the pilot, instead of the pilot manually entering the weather data.

Referring to FIG. 1, a schematic illustration of an aircraft control center 100 is shown according to an embodiment of the inventive concepts disclosed herein. The aircraft control center 100 includes one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. According to various exemplary embodiments of the inventive concepts disclosed herein, at least one of the flight displays 102 may be configured to provide a rendered display from the systems and methods described herein. For example, the flight displays 102 may be configured to generate a display for providing information relevant to the pilot during a takeoff or landing sequence.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information. Graphical representations of the displayed information may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, enable an aircraft crew member to interact with various avionics applications and perform functions such as data entry, manipulation of navigational maps, and moving among and selecting checklist items. For example, the UI elements 104 may be used to adjust features of the flight displays 102, such as contrast, brightness, width, and length. The UI elements 104 may also (or alternatively) be used by an aircraft crew member to interface with or manipulate the displays of the flight displays 102. For example, the UI elements 104 may be used by an aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Figure 2:
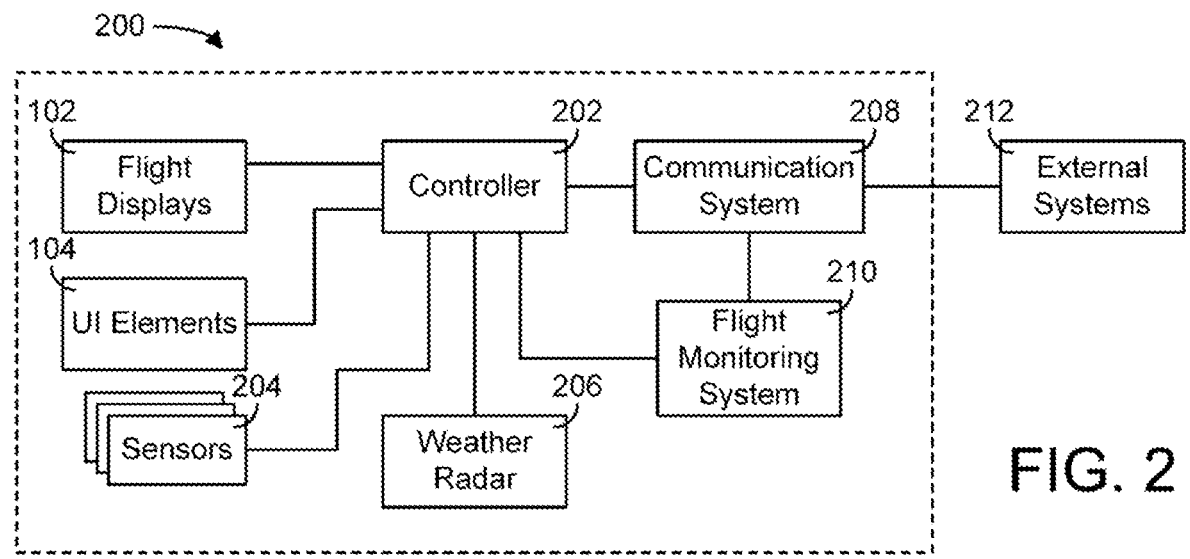
FIG. 2 is a block diagram of a flight management system for assisting an aircraft during a departure or arrival sequence according to the inventive concepts disclosed herein.

Referring to FIG. 2, a block diagram of a flight management system 200 including a controller 202 is shown according to the inventive concepts disclosed herein. The flight management system 200 includes a controller 202, the flight displays 102 and UI elements 104, a plurality of sensors 204, a weather radar system 206, a communication system 208, and a flight monitoring system 210. The flight management system 200 may include other systems and components for general aircraft operation.

The controller 202 is configured to send data to and receive data from, or otherwise facilitate electronic data communications, with the other systems of the flight management system 200 or with remote systems such as satellite-based systems or ground-based systems. The controller 202 may further interface with an aircraft control system, aircraft monitoring system, or other such system. The controller 202 may be configured to generally receive input from the various other systems and determine one or more flight parameters for a takeoff or landing sequence based on the input. The activities of the controller 202 are shown in greater detail in FIG. 3. In various embodiments, the controller 202 may be configured to perform any of the actions described with any of the various other systems of the flight management system 200 as described herein.

The plurality of sensors 204 may include, for example, one or more fuel sensors, airspeed sensors, location tracking sensors (e.g., GPS), lightning sensors, turbulence sensors, pressure sensors, optical systems (e.g., camera system, infrared system), weather sensors, such as outside air temperature sensors, winds at altitude sensors, INS G load (in-situ turbulence) sensors, barometric pressure sensors, humidity sensors, or any other aircraft sensors or sensing system that may be used to monitor the performance of an aircraft or weather local to the aircraft. The plurality of sensors 204 may include one or more sensors configured to acquire air data indicative of at least one air characteristic (e.g., a pressure, an indicated airspeed, a true airspeed, an angle of attack, a pitch angle, an altitude, a temperature) of an environment surrounding the aircraft. The sensors may be located in various positions on the aircraft, and a single sensor may be configured to acquire more than one type of sensor data. The plurality of sensors 204 may further include one or more sensors configured to measure various aircraft flight parameters (e.g., the weight of the aircraft). Data from the sensors 204 is output to the controller 202 for further processing and display as described below.

The weather radar system 206 may be a system for detecting weather patterns. For example, the weather radar system 206 may detect wind patterns (e.g., a wind speed, a wind direction, forecasted winds, a magnetic heading, a cross-track, and the like). The wind data may be transmitted from the weather radar system 206 to the controller 202 to adjust a takeoff or landing speed, descent angle, and the like. The weather radar system 206 may estimate wind data using wind models, and may further detect other weather conditions (e.g., precipitation, temperature, humidity) that may impact the aircraft. In some embodiments, the weather radar system 206 is configured to detect rain, ice, slush, and snow on the surface of the runway and to provide this information to the controller 202. The controller 202 is configured to receive data from the weather radar system 206 and to use the received data to determine the runway condition (e.g., an amount of rain, ice, slush, or snow covering the surface of the runway).

The flight monitoring system 210 may be or include at least one of a GPS, a Global Navigation Satellite System (GNSS), an altitude heading and reference system (AHRS), and an inertial reference system (IRS). The flight monitoring system 210 is configured to acquire flight data indicative of at least one flight characteristic of the aircraft. The flight characteristics may include, for example, a ground speed, a vertical speed, a pitch angle, or an altitude of the aircraft. Data from the flight monitoring system 210 is output to the controller 202.

The communication system 208 facilitates communications between the controller 202 and one or more external systems 212 (e.g., a satellite system, other aircraft, a terrestrial station, or other air, space, or ground-based system). For example, the communication system 208 may send data to and receive data from external ground-based weather supplier systems and ground-based air traffic control systems. The communication system 208 may communicate with an external system 212 using any type of communication protocol or network (e.g., via a mobile network, via one or more bi-directional or uni-directional communication channels) and may include any type of wired or wireless interface for facilitating the communication. It should be understood that the information received by the controller 202 as described in the present disclosure may come from any internal or external source.

Figure 3:
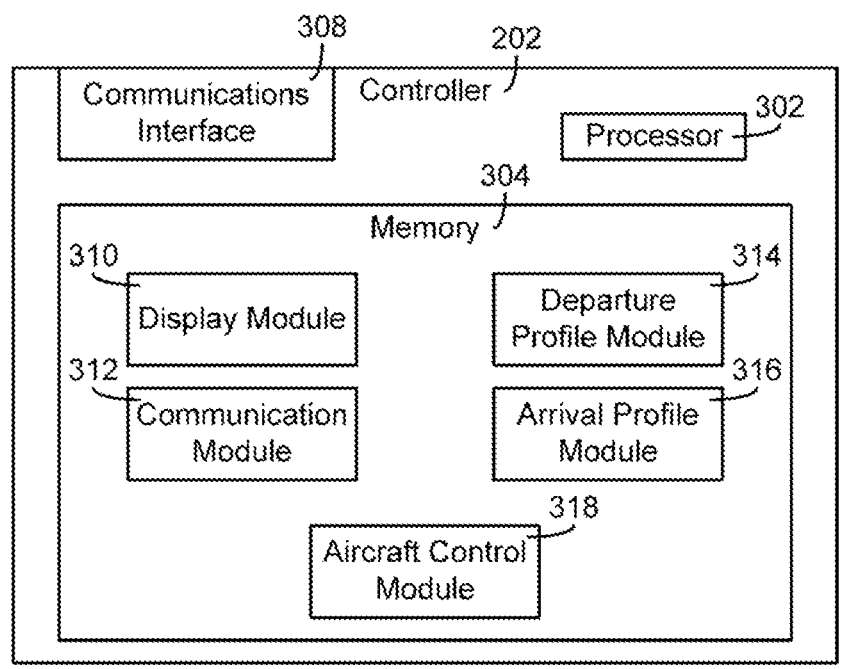
FIG. 3 is a detailed block diagram of the controller of the flight management system of FIG. 2 according to the inventive concepts disclosed herein.

Referring now to FIG. 3, the activities of the controller 202 are shown in greater detail according to the inventive concepts disclosed herein. As described above, the controller 202 may generally be configured to calculate one or more flight parameters for the aircraft during a takeoff or landing process. The controller 202 may further be responsible for other general aircraft-related functionality, which are not shown in FIG. 3 for the sake of simplicity.

The controller 202 generally includes a processor 302 and a memory 304. The processor 302 may be implemented as a specific purpose processor, an application specific integrated circuit (ASIC), one or more field programmable gate arrays (FPGAs), a group of processing components, or other suitable electronic processing components. The memory 304 is one or more devices (e.g., RAM, ROM, flash memory, hard disk storage) for storing data and computer code for completing and facilitating the various user or client processes, layers, and modules described in the present disclosure. The memory 304 may be or include volatile memory or non-volatile memory and may include database components, object code components, script components, or any other type of information structure for supporting the various activities and information structures of the inventive concepts disclosed herein. The memory 304 is communicably connected to the processor 302 and includes computer code or instruction modules for executing one or more processes described herein. The controller 202 further includes a communications interface 308 configured to facilitate communications between the controller 202 and the other aircraft systems. It should be understood that in alternative embodiments, the activities of one or more modules shown in the memory 304 may be executed at other aircraft systems and provided to the controller 202.

For completing the activities described herein, the controller 202 may have knowledge of the destination of the aircraft (for arrival profile calculations), the current location of the aircraft, a current time, and a destination time. The pilot may enter, before departure, a current location, departure time, estimated landing time, and/or destination (e.g., another airport). Alternatively, some or all of this information can be retrieved via the communications interface 308. In the embodiments described herein, the controller 202 has general knowledge of a destination of the aircraft, an estimated flight plan, and other such information.

Figures 4, 5:
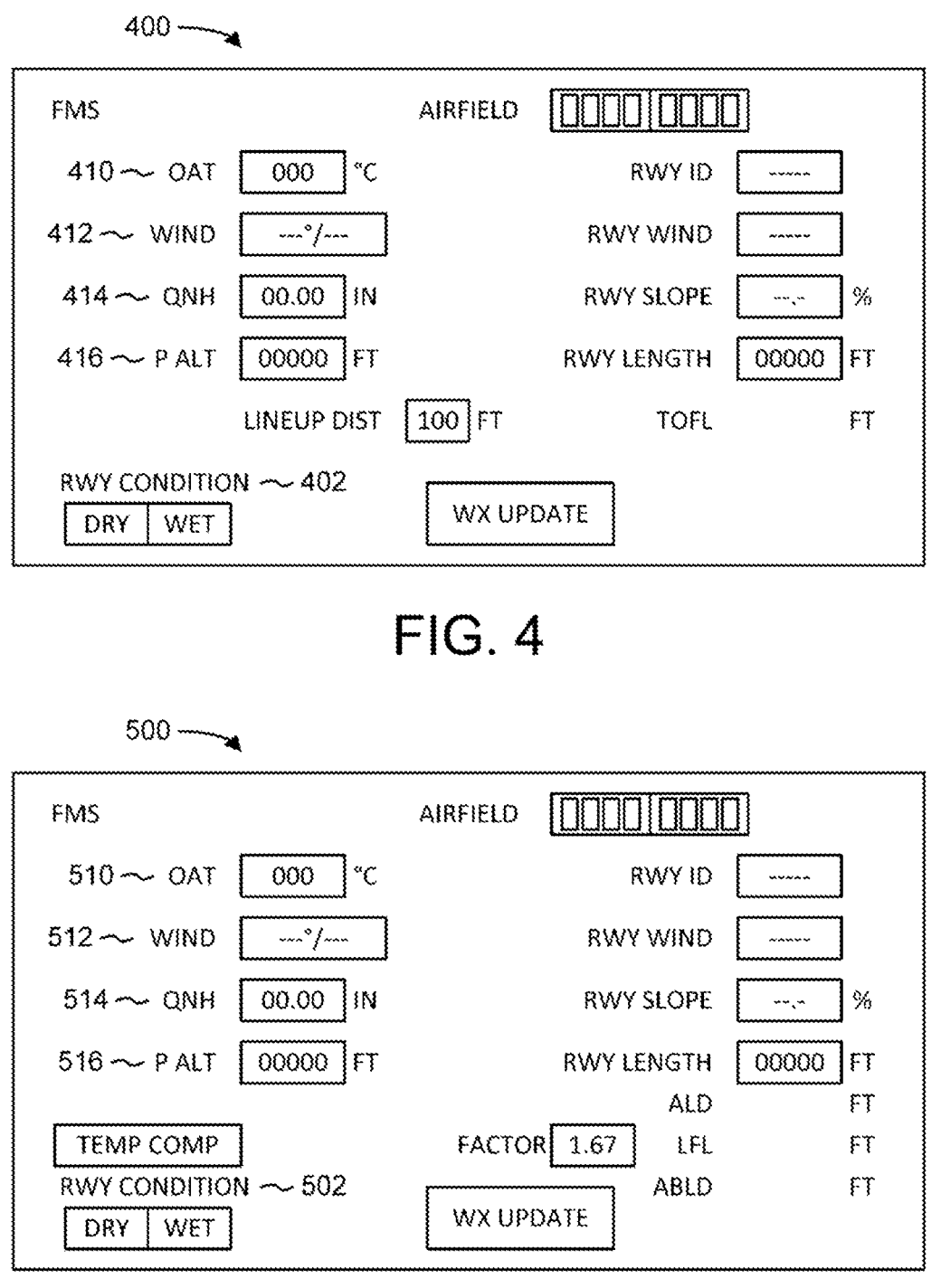

The memory 304 includes a display module 310 for generating an output for one or more of the flight displays 102. The display module 310 may generate a display such as those shown in FIGS. 4-5, for example. The displays may generally include flight information, such as the current status of the aircraft and one or more buttons or other selectable options. For example, as generally shown in FIGS. 4-5, one example display may illustrate current weather conditions and a current status of several aircraft subsystems (e.g., anti-ice systems, flap status). The displays include one or more fields that are selectable by the pilot. For example, if the flight displays 102 are touchscreen displays, the pilot may select one or more options by touching the screen.

In one embodiment, as shown in FIGS. 4-5 and described in greater detail below, the pilot may request updated information (e.g., updated weather data or an updated arrival or landing plan) via a selection on the touchscreen or via a UI element 104. The request may be made in anticipation of either a takeoff process or landing process of the aircraft. In some embodiments, the request may be auto generated by a system of the aircraft based on a location of the aircraft (e.g., upon the aircraft taxiing to the runway prior to take off, upon the aircraft debarking from a gate or terminal). For example, the request may be provided by the pilot as the aircraft is holding short of a runway awaiting takeoff, the weather data to be used for calculating a departure profile (e.g., a plurality of flight parameters such as an angle of the aircraft during climbing, a minimum speed required for takeoff). As another example, the request may be made by the pilot during flight, the weather data to be used for calculating a landing profile (e.g., a descent rate, angle of the aircraft during the descent, a minimum speed to maintain).

In one embodiment, the pilot may make a request for updated information a target distance away from a destination (e.g., 80 to 100 miles away from an airport at which the aircraft is landing). The request may be made as the pilot begins preparation for descent or as the pilot beings a landing procedure.

The memory 304 includes a communications module 312 configured to facilitate communication with a remote system upon receiving a request for updated weather data. For example, the communications module 312 may establish a connection with the nearest ground station. The communications module 312 may facilitate the sending and receiving of weather data (and other information) via any type of communications protocol. In one embodiment, a ground station may communicate with systems onboard the aircraft via an Aircraft Communications Addressing and Reporting System (ACARS). The ACARS is a digital datalink system configured to facilitate transmissions of short messages between an aircraft and the ground station via airband radio or satellite.

The weather data transmitted from the ground station to the aircraft may include, for example, a temperature, a wind speed, and a wind direction. The weather data may further include a dew point, pressure, visibility, ceiling, precipitation, and cloud cover. The aircraft may request any type of weather data, and the ground station may transmit any type of weather data to the aircraft. It should be understood that the type of weather data transmitted to the aircraft and used by the aircraft to calculate departure and arrival flight parameters may vary in different embodiments of the present disclosure.

As one example, the weather data may be transmitted as an aviation routine weather report (METAR report). The METAR report generally provides outside air temperature and wind speed and wind direction at specific airports. The METAR report further provides barometric pressure data, which can be used in the computation of the pressure altitude. The METAR data further provides precipitation information (rain, drizzle, snow) which may be used to determine the condition of the runway for takeoff and landing. A METAR report provided to the aircraft may be in the following machine-readable format: KCID 101252Z 07009KT 1/4SM FG VV002 14/14 A2979 RMK A02 SLP086 T01390139, which indicates the conditions at KCID (CEDAR RAPIDS, IA, US) observed 1252 UTC 10 May 2016, a temperate of 13.9° C. (57° F.), a dew point of 13.9° C. (57° F.) [RH=100%], a pressure via an altimeter reading of 29.79 inches Hg (1008.9 mb) [Sea-level pressure: 1008.6 mb], winds from the east-northeast (70 degrees) at 10 MPH (9 knots; 4.7 m/s), visibility of 0.25 miles (0.40 km), an indefinite ceiling with vertical visibility of 200 feet AGL, obscured sky cloud level, and that the current weather includes FG (fog). It will be appreciated that weather data may be received in other formats.

The memory 304 further includes a departure profile module 314 and an arrival profile module 316 configured to calculate one or more flight parameters related to a departure or arrival of the aircraft, respectively. The one or more flight parameters are calculated based on the received weather data in conjunction with other aircraft data (e.g., data from other sensors 204 such as the weight of the aircraft).

The departure profile module 314 calculates one or more flight parameters for a takeoff sequence of the aircraft. The flight parameters may include, for example, takeoff V-speeds such as Decision Speed (V1), Rotation Speed (VR), or Minimum Takeoff Safety Speed (V2), a minimum takeoff distance required for the takeoff sequence, flap settings, and the like. By using the weather data in the calculation of the flight parameters, the departure profile module 314 accounts for how weather conditions may impact the aircraft during takeoff. For example, the temperature and pressure altitude may impact the acceleration of the aircraft as it reaches the minimum speed.

In one embodiment, the departure profile module 314 may use a runway condition when calculating the one or more flight parameters. The runway condition may either be specified by a pilot via a touchscreen input, UI elements, or another input, or the runway condition may be inferred from the weather data (e.g., if it is raining, the runway will be wet). The runway condition may impact the ability of the aircraft to, for example, reach the minimum speed, or may result in a larger minimum takeoff distance required for takeoff or stopping distance for an aborted takeoff.

The arrival profile module 316 calculates one or more flight parameters for a landing sequence of the aircraft. The flight parameters may include, for example, approach V-speeds such as Reference Landing Speed (VREF) or Approach Climb Speed (VAC), a minimum landing distance required, flap settings, and the like. By using the weather data in the calculation of the flight parameters, the arrival profile module 316 accounts for how weather conditions may impact the aircraft during landing. For example, the wind speed and direction may impact the descent rate of the aircraft, or impact the ability to line up the aircraft with a runway during landing.

In one embodiment, the arrival profile module 316 may use a runway condition to calculate the one or more flight parameters. The runway condition may either be specified by a pilot via a touchscreen input, UI elements, or another input, or the runway condition may be inferred from the weather data (e.g., if it is raining, the system may infer that the runway is wet). The runway condition may impact the ability of the aircraft to, for example, stop within the minimum landing distance required once the aircraft has touched down.

Using the departure profile module 314 or arrival profile module 316, the controller 202 may update one or more flight displays 102 with the information and adjust the operation of the aircraft. The memory 304 further includes an aircraft control module 318 configured to provide one or more flight parameters to various aircraft subsystems based on the departure profile or arrival profile. For example, the aircraft control module 318 may cause an adjustment of one or more flap positions, may adjust the angle of the aircraft relative to the ground, and may accelerate or decelerate the aircraft. As described above, the display module 310 generates a display for the flight displays 102 of the aircraft. The display module 310 may receive the departure profile or arrival profile and update the displays accordingly, which is shown in greater detail in FIGS. 4-5.

When the controller 202 receives METAR data from a METAR report (or weather data in another format), the data may include a timestamp. For example, the ACARS may be configured to request METAR data to be transmitted once an hour. When METAR data is transmitted to the aircraft in response to such a request, the weather data may be one minute old or fifty-nine minutes old, for example. In other words, the ACARS (or other communications system) prepares the weather data not in response to a request for the data but instead based on a set schedule. In one embodiment, the controller 202 may be configured to determine the age of the weather data received at the aircraft. If the weather data is older than a threshold amount of time (e.g., one hour), the controller 202 may alert the pilot that the weather data that was used for the calculation of the flight parameters for departure or arrival may be out of date and that more up to date weather data should be transmitted to the aircraft.

In such a scenario, the display module 310 may prompt the pilot via the flight displays 102. The prompt may allow the pilot to request updated weather data, and a corresponding updated departure or arrival profile. In another embodiment, the controller 202 may automatically retrieve updated weather data once the threshold amount of time is reached, and automatically display updated weather data and a departure or arrival profile.

Referring generally to FIGS. 4-5, example displays that may be provided on the flight displays 102 are shown according to the inventive concepts disclosed herein. The displays shown in FIGS. 4-5 are example displays that provide departure and arrival profile information to the pilot.

FIGS. 4-5 depict a user interface 400 for displaying departure information and a user interface 500 for displaying landing information, respectively. The user interfaces of FIGS. 4-5 are provided as examples of a user interface that can be presented to a pilot of an aircraft after the pilot requests updated weather data (e.g., by pushing a button the user interface). The user interface generally includes fields for a current temperature, wind, atmospheric pressure, and altitude, along with information about the runway the aircraft is departing from or arriving on (e.g., name, wind conditions at the runway, runway slope, runway length). For example, in one embodiment, upon selection of an update button (e.g., such as the WX Update button), the controller 202 retrieves or requests updated weather information from a ground station and calculates or updates a departure profile for the aircraft. In one embodiment, the controller 202 updates fields on the user interface 400 relevant to taking off, such as fields for outside air temperature (OAT) 410, wind speed and direction (WIND) 412, barometric pressure adjusted to sea level (QNH) 414, pressure altitude (P ALT) 414. In some embodiments, at least one V-speed or multiple V-speeds may be shown on the user interface 400, which indicate important speeds for operation of a particular aircraft, such as a minimum speed the aircraft must reach during takeoff. It will be appreciated that any V-speed may be displayed based on a current state or condition of the aircraft (e.g., prior to take off or during a descent). The controller 202 calculates the V-speeds based in part on the weather data, and is configured to provide the V-speeds for display on the user interface 400 in some embodiments.

The user interfaces of FIGS. 4-5 further include a runway condition field 402, 502 that enables a pilot to specify a runway condition. The pilot may select a runway condition based on if a runway is wet or dry. For example, in the case of a departure, the pilot may clearly be able to interpret a current condition of the runway and may provide the condition to the controller 202 without the controller 202 having to infer the condition. The runway condition field 402, 502 may further indicate to the pilot a selected runway condition by the controller 202 (e.g., if the controller 202 detects precipitation at the runway, the controller 202 may automatically select the wet runway option).

According to various exemplary embodiments, the flight displays may further incorporate an EVS or a display system otherwise provided with radar sensing and imagery displayable to a pilot or co-pilot on an aircraft display, such as an HDD or HUD. For example, the flight displays may include or use a weather radar system to display an image based upon radar return data. In some embodiments, a Doppler weather radar system may be configured to have enhanced resolution (e.g., angular resolution and/or range resolution). Reflectivity of radar returns from runway structures in an airport terminal or runway environment, such as, an approach lighting system with radar reflectors, a threshold lighting system with radar reflectors, and/or a runway edge lighting system with radar reflectors, can be sensed. As will be appreciated, using a radar system configured according to the various exemplary embodiments provides greater range than passive FLIR or visible light camera systems in low visibility conditions, such as, heavy fog, given radar systems' superior ability to penetrate heavy fog.

Using a radar system such as the weather radar system configured according to the various exemplary embodiments may also provide EVS imagery having sufficient accuracy in low visibility conditions (given that many of the visual references required under Title 14 of the Code of Federal Regulations, part 91, such as, approach lighting systems, threshold lighting systems, runway edge lighting systems, and other runway structures, are metallic structures that exhibit high radar reflectivity). The imagery may allow lower landing minima (e.g., 100 feet or less) in some embodiments.

The flight displays may include a radar processing component in communication with the radar system and configured to generate image data for display in some embodiments. In some embodiments, the image data is processed to provide a two-dimensional aircraft situation display (e.g., vertical profile display or plan view display) or three dimensional or perspective aircraft situation display image representative of the 3-D positions of runway structures in an airport terminal or runway environment based on the radar returns as described in U.S. patent application Ser. Nos. 14/301,199 and 14/482,681 incorporated herein by reference in their entireties in some embodiments. In some embodiments, the image data can include visual approach slope indications (VASI) or precision approach path indications (PAPI) even though the lights associated therewith are not visible.

According to certain exemplary embodiments, a weather radar system or other like radar system can be used to detect reflectors attached to runway light structures (e.g., stanchions, conduit, brackets, housings, etc.). Utilizing the high radar cross section associated with the reflectors advantageously allows detection to be achieved whether at day or night, regardless of whether runway lights are on or are off in some embodiments. In certain embodiments, the lighting system may not even exist at an airfield, and only radar-reflecting approach marking structures may be deployed, leading to cost savings for the airfield (no power lines necessary, nor lighting control cabinets, nor the ongoing operating costs of electrical fixtures). In one embodiment, an approach lighting system can be identified from the image generated from the radar data. In certain embodiments, the systems and methods can be utilized as extension to a combined vision system (CVS).

In some embodiments, the radar reflectors are arranged to provide a response for deriving visual approach slope indications or precision approach path indications outputs. The radar reflectors are metal components of any of a variety of shapes in some embodiments and are disposed to reflect radiation from a number of directions. In some embodiments, the reflectors are arranged as corner reflectors, spherical reflectors, ellipsoidal reflectors, parabolic reflectors, or horn reflectors including but not limited to pyramidal horn reflector, sectoral horn reflector, an E-plane horn reflector, an H-plane horn reflector, a conical horn reflector, an exponential horn reflector, a corrugated horn reflector, a ridged horn reflector, a septum horn reflector, and an aperture-limited horn reflector. The specific reflector shape could be chosen to reflect radiation preferentially in certain directions, at certain angles and with a certain distribution, in order to create radar return beam shapes, strengths and directionality mimicking those of lighting beams at airfields. For example, reflections could be formed to provide preferential returns along the airfield's glideslope, or within a cone photometrically comparable to that emitted by current visible spectrum lighting systems.

Referring to FIG. 6, a radar system 602 (which may be implemented and may function similarly to the weather radar system 206 of FIG. 2) is provided in the aircraft 600 having an aircraft control center or cockpit (100, FIG. 1). The aircraft control center 100 includes flight displays (102, FIG. 1) embodied as head down displays (HDDs). The aircraft control center 100 can also include a combiner associated with a head up display (HUD) system.

According to some embodiments, radar system 602 is configured to provide an image based upon radar data to at least one flight display 102 for viewing by the pilot of aircraft 600. Radar system 602 processes radar return data to detect a radar reflector 608 attached to a light structure 604 associated with a runway (e.g., during approach and/or landing). In some embodiments, the flight displays 102 provide a merged image of terrain derived from two or more of enhanced vision data, radar data, and SVS data as discussed in U.S. application Ser. No. 14/536,330 incorporated herein by reference and assigned to the assignee of the present application. Advantageously, real time radar data can be provided in real-time, all-weather detection of one or more light structures 604 in some embodiments. Advantageously, the radar data can be processed to identify light structures 604 so that the runway and its orientation can be viewed by one or more pilots in challenging weather conditions in some embodiments.

In some embodiments, the radar reflectivity of light structure 604 is augmented or enhanced by radar reflector 608. Light structure 604 is a bracket, housing, conduit, stanchion, cage, or other structure associated with lighting such as runway lights. Light structure 604 is associated with an approach lighting system, an edge lighting system, centerline lighting system, signage, etc. in some embodiments.

In some embodiments, radar reflector 608 is a metal or other radar reflective component attached to light structure 604 to increase its radar reflectivity in some embodiments. Radar reflector 608 has a rectangular, square, oval, bow tie, or circular cross-section and is relatively planar in some embodiments. In some embodiments, radar reflector 608 has a three-dimensional shape (e.g., parabolic, spherical, prismatic, pyramidal, etc.) for directionally reflecting radar beams. In some embodiments, radar reflector 608 is configured for retrofitting to an existing runway light or is integrated with the runway light.

Referring to FIG. 7, a runway light 700 includes a light structure 708, a component 710, and a stanchion 704 in some embodiments. Runway light 700 can be part of a set of runway lights attached to one or more stanchions, such as stanchion 704. Runway light 700 can be any of a variety of types of lighting associated with an airport and can have bulbs, lenses, shields and housings of various shapes and sizes. Stanchion 704 can be electrical conduit, housing, bracket, or a post for runway light 700 in some embodiments. Component 710 includes a radar reflector 714 similar to radar reflector 608 discussed with reference to FIG. 6. In some embodiments, radar reflector 608 is a stand-alone element and not attached to existing infrastructure.

Component 710 includes a collar 712 configured to fit over an end 722 of stanchion 704. Collar 712 can be glued, fastened, welded, or otherwise attached to stanchion 704. Component 710 also includes an end 724 for fitting within a collar 726 of light structure 708. End 724 can be glued, fastened, welded, or otherwise attached to light structure 708. In some embodiments, ends 722 and 724 slideably engage collars 712 and 726, respectively, and are fastened to respective ends 722 and 724 by a set screw.

In some embodiments, component 710 is configured for retrofitting to an existing light structure 708. In some embodiments, component 710 includes two pieces (e.g., semicircular in cross section) which can be attached to each other around existing wiring between stanchion 704 and light structure 708 so runway light 700 does not have to be rewired when component 710 is installed. In some embodiments, end 724 of component 710 can fit over collar 726. In some embodiments, collar 712 of component 710 can fit within end 722 of stanchion 704.

Radar reflector 714 can have a variety of shapes. In some embodiments, radar reflector 714 is a plate, such as a 2 inch by 4 inch by ⅜ inch metal plate. In some embodiments, radar reflector 714 has a volumetric shape (e.g., horn reflector, spherical, parabolic reflector, pyramidal reflector, etc.). Radar reflector 714 can be angled in the vertical plane (e.g., 0-10 degrees, 2-5 degrees, 3 degrees) to provide reflections to aircraft (600, FIG. 6) at approach or landing slopes in some embodiments.

In some embodiments, radar reflector 714 is shaped such that radar returns are proportional to the location of radar system 602. Radar reflector 714 is shaped according to current PAPI or VASI standard approach lights that have visual angular dependence in some embodiments. In some embodiments, radar reflector 714 and other reflectors in a set of reflectors are themselves shapes to provide this PAPI or VASI response without extraction or derivation being required by radar system 602.

Referring to FIG. 3, a runway light 800 includes a light structure 808 and a stanchion 804 in some embodiments. Stanchion 804 may be implemented similarly to stanchion (704, FIG. 7) in some embodiments. Runway light 800 includes a radar reflector 814 similar to radar reflector 608 discussed with reference to FIG. 6. Radar reflector 814 can be integrated with light structure 308 in some embodiments. Light structure 808 includes a collar 810 configured to fit over stanchion 804.

Referring to FIG. 9, a runway light 900 includes a light structure 908 and a stanchion 904 in some embodiments. Runway light 900 can be a directional runway light in some embodiments. Stanchion 904 may be implemented similarly to stanchion (704, FIG. 7) in some embodiments. Runway light 900 includes a radar reflector 914 similar to radar reflector 608 discussed with reference to FIG. 6. Radar reflector 914 is integrated with light structure 408 or is attached using a component similar to component (710, FIG. 7) in some embodiments.

Figure 10:
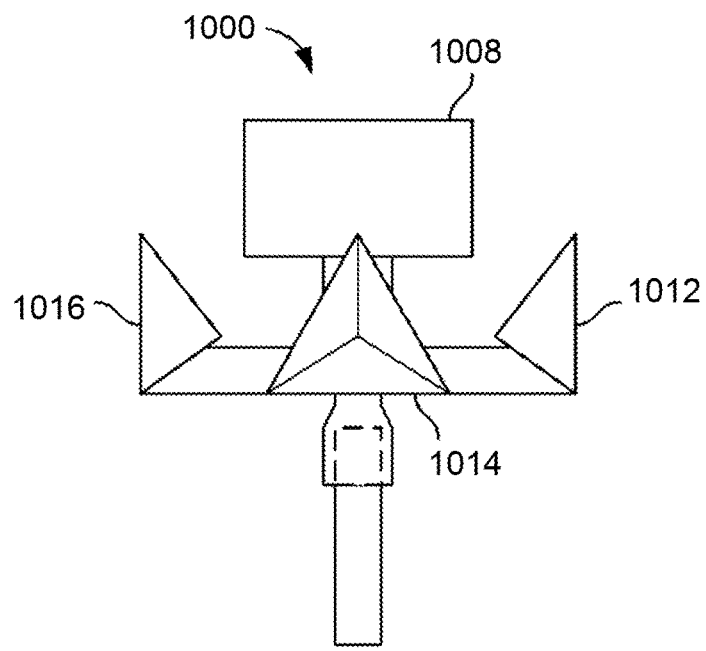
FIG. 10 is a planar side view schematic drawing of a runway light and radar reflectors for use in the system illustrated in FIG. 6 according to some embodiments.
Figure 11:
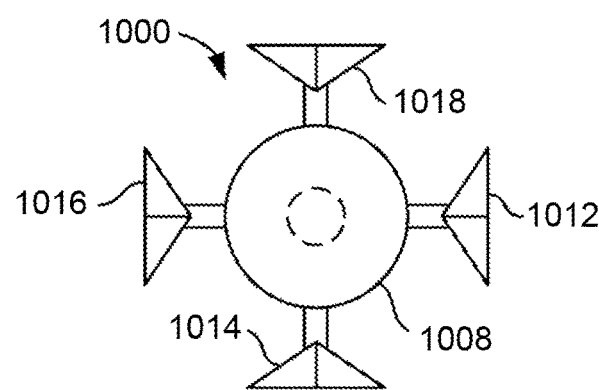
FIG. 11 is a planar top view schematic drawing of the runway light and radar reflectors

Referring to FIGS. 10 and 11, a runway light 1000 includes a light structure 1008 and a stanchion 1004 in some embodiments. Stanchion 1004 may be implemented similarly to stanchion (704, FIG. 7) in some embodiments. Runway light 1000 includes a set of radar reflectors 1012, 1014, 1016, and 1018 similar to radar reflector 608 discussed with reference to FIG. 6. Radar reflectors 1012, 1014, 1016, and 1018 can be integrated with light structure 1008 in some embodiments or attached using an element similar to component (710, FIG. 7).

Radar reflectors 1012, 1014, 1016, and 1018 are corner reflectors made from a suitable radio reflective material in some embodiments. In some embodiments, radar reflectors 1012, 1014, 1016, and 1018 are made from a metal, such as, aluminum. Radar reflectors 1012, 1014, 1016, and 1018 are provided at the runway in some embodiments. In some embodiment, radar reflectors 1012, 1014, 1016, and 1018 have a pyramidal or triangular shape. In some embodiments, radar reflectors 1012, 1014, 1016, and 1018 are open faced pyramidal/triangular systems configured so that a beam that strikes one of radar reflectors 1012, 1014, 1016, and 1018 bounces directly back to radar system (602, FIG. 6) over a large range of incident angles. Radar reflectors 1012, 1014, 1016, and 1018 can be sized differently so that each radar reflector 1012, 1014, 1016, and 1018 can be identified. For example, a north facing reflector can have twice the radar cross section from a west facing reflector so that reflections from each can be distinguished by return power level.

Figure 12:
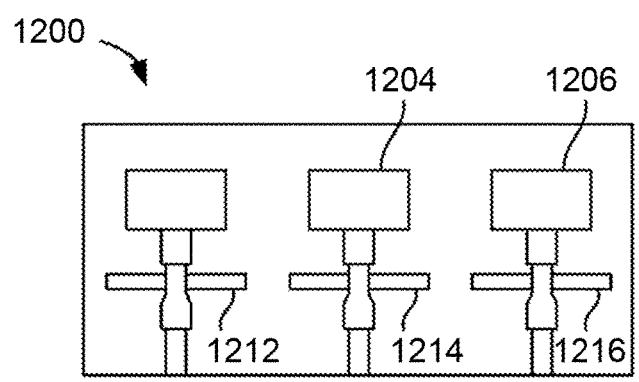
FIG. 12 is a front view schematic drawing of an approach lighting system with radar reflectors for use in the system illustrated in FIG. 6 according to some embodiments.

Referring to FIG. 12, an approach lighting system 1200 includes runway lights 1202, 1204, and 1206. Lights 1202, 1204, and 1206 can be similar to lights 700, 800, 900, or 1000 (FIGS. 7-10 respectively) and include respective radar reflectors 1212, 1214, and 1216.

In some embodiments, reflectors 1212, 1214, and 1216 are configured to provide visual approach slope indications or precision approach path indications. Radar reflectors 1212, 1214, and 1216 can be positioned and oriented to provide radar reflections when aircraft (600, FIG. 6) is in the proper glide slope (e.g., 2.8-3.2 degrees, or 2.5-3.5 degrees). In some embodiments, radar system (602, FIG. 6) provides a vertical scan and determines a maximum reflection from radar reflectors 1212, 1214, and 1216. When the maximum reflection is at a tilt angle corresponding to a proper glide slope, radar system 602 provides a proper visual approach slope indications or precision approach path indications. Advantageously, reflectors 1212, 1214, and 1216 can be attached to an existing approach landing system for providing non-lighting-based visual approach slope indications or precision approach path indications.

In some embodiments, radar reflectors having different sizes are configured as follows: one size having maximum reflection at less than 2.8 degree glide slope, one size having maximum reflection greater than 3.2 degree glide slope, and one size having maximum reflection between a 2.8 and 3.2 glide slope. Radar system 602 can process the returns from such radar reflectors and provide e visual approach slope indications or precision approach path indications according to which reflections are sensed. U.S. Pat. No. 8,576,131 incorporated herein by reference discusses size-based sensing of radar reflectors. In some embodiments, radar reflectors having different sizes are configured as follows: one size having maximum reflection at less than 2.5 degree glide slope, one size having maximum reflection greater than 3.5 degree glide slope, one size having maximum reflection between a 2.5 and 2.8 glide slope, one size having maximum reflection between 3.2 and 3.5 degree glide slope, and one size having maximum reflection between a 2.8 and 3.2 glide slope.

Figure 13:
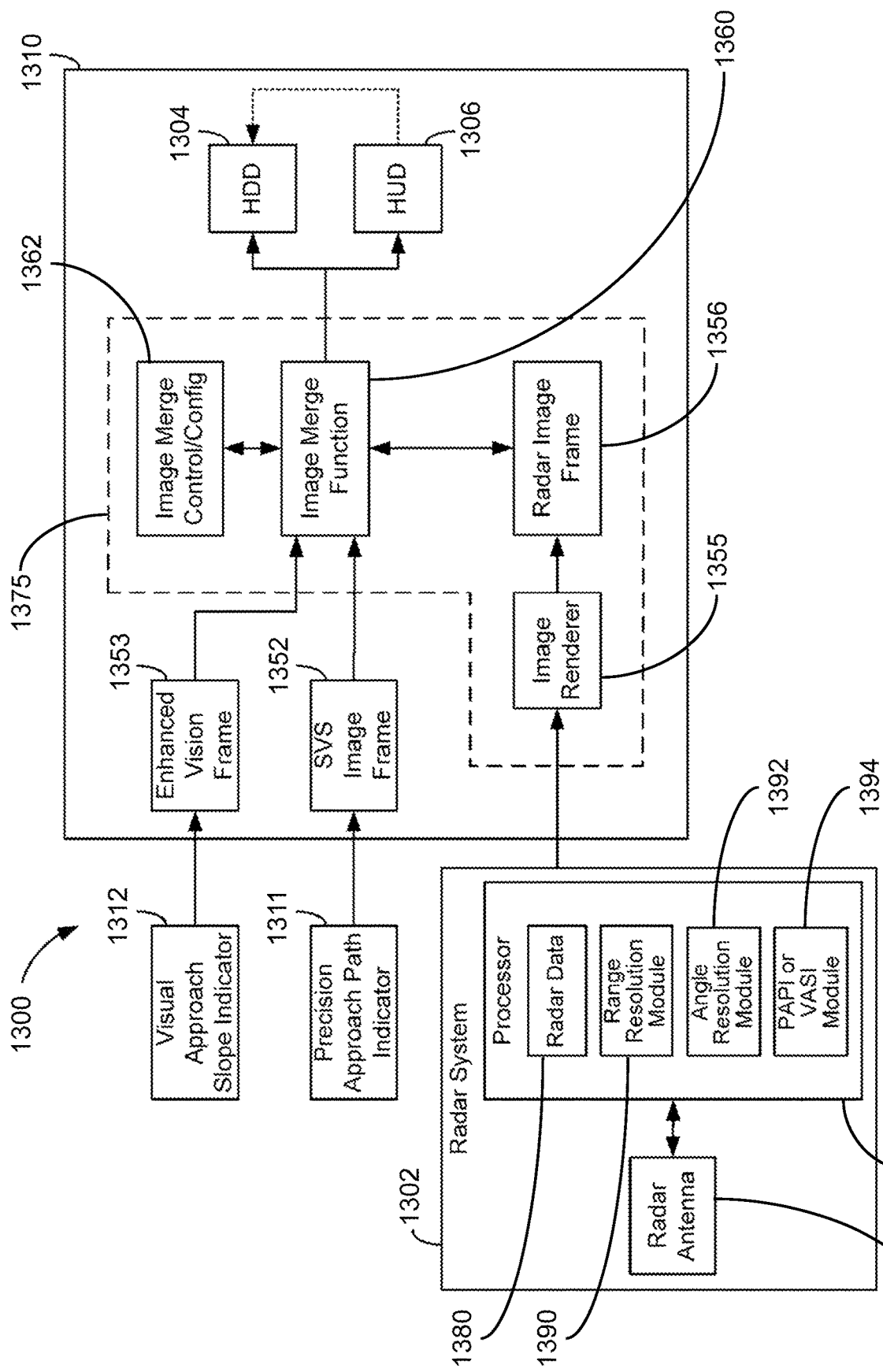
FIG. 13 is a general block diagram of a system for sensing runway lights according to some exemplary embodiments.

With reference to FIG. 13, a display system 1300 can be utilized for providing an image to head down display 1304 or head up display 1306. Display system 1300 is in communication with or includes a radar system 802 (e.g., similar to flight displays (102, FIG. 1) and/or radar system 602 (FIG. 6)), a synthetic vision system (SVS) 1311 and an enhanced vision system (EVS) 1312. EVS 1312 and the SVS 1311 are optional in some embodiments. Display system 1300 includes a memory 1353 for storing enhanced vision frame from the EVS 1312, a memory 1352 for storing enhanced vision frame from the SVS 1311, an image renderer 1355, a memory 1356 for storing the radar image from the image renderer 1355, an image merge function component 1360, and an image merge control/configuration component 1362.

Image renderer 1355, image merge component 1360, and the image merge control/configuration component 1362 can be embodied as software modules operating on a computing platform or a processor 1375 and can be stored on a non-transitory medium. Processor 1375 can be part of or integrated with radar system 1302, SVS 1311, EVS 1312, or displays 1302 and 1304 in some embodiments. In some embodiments, processor 1375 is an independent platform.

Radar system 1302 is a weather or other radar system (e.g., weather radar system (206, FIG. 2) and/or radar system (602, FIG. 6) generally located inside the nose of the aircraft, 100 inside a cockpit of the aircraft, on the top of the aircraft or on the tail of the aircraft in some embodiments. Radar system 1302 can include a radar data storage unit 1380, a radar antenna 1382 and a processor 1385. Radar system 1302 can be a weather radar system, such as, a Multiscan™ radar system from Rockwell Collins, Inc. configured as described herein. The radar system 1302 can utilize a split, half or sub-aperture or other technique for obtaining radar data associated with external surroundings in some embodiments. Radar system 1302 can use the split or sub-aperture techniques of the radar systems described in U.S. application Ser. Nos. 13/627,788, 12/892,563, 13/250, 798, 12/236,464, and 12/167,200 and U.S. Pat. No. 8,077, 078, incorporated herein by reference and assigned to the assignee of the present application. The type of the radar system 1302 and data gathering techniques are not discussed in the specification in a limiting fashion.

Processor 1385 receives radar returns (e.g., weather radar returns data) from the radar antenna 1382, processes the radar returns and provides the radar data in radar data storage unit 1380. In some embodiments, the data stored in radar data storage unit 1380 can be stored as an image frame representing the data from a radar scan of the external surroundings (e.g., a runway environment).

The radar data associated with the external surroundings can represent detected targets and the location of the detected targets. Targets include terrain, man-made features, objects, runways, radar reflectors (608. FIG. 6), etc. Improved angular resolution and range resolution techniques allow the location of the targets to be more accurately determined and represented in image data in some embodiments. Radar system 1302 scans the external surroundings in front of aircraft 600 to sense the location of targets (e.g., radar reflectors 608). Radar system 1302 can utilize clutter suppression and Doppler filtering to improve performance in some embodiments.

Radar system 1302 includes radar data memory 1380, a range resolution component 1390, an angle resolution component 1392, and visual approach slope indication or precision approach path indication component 1394 in some embodiments. Range resolution component 1390, angle resolution component 1392, and visual approach slope indication or precision approach path indication component 1394 are optional and conventional radar processing can be utilized to obtain and display returns from radar reflectors 608 and to provide VASI and PAPI indications as described below.

Range resolution component 1390 advantageously increases the range resolution of the radar system 1302 when compared to alternative radar sensing operations, for example, weather or wind shear sensing, in some embodiments. Angle resolution component 1390 advantageously increases the angle resolution of radar system 1302 when compared to alternative radar sensing operations in some embodiments. Component 394 processes the radar data to provide visual approach slope indications or precision approach path indications based upon returns received from radar reflectors (1202, 1204, 1206; FIG. 12) in some embodiments. In some embodiments, processing of radar return data from component 1394 leads to a representation of the radar-sensed PAPI or VASI structures similar to the representation currently sensed by pilots using natural vision. The increased resolution in range and angle allows a higher resolution image to be provided on the displays 1302 and 1304 in some embodiments. Range resolution component 1390, angle resolution component 1392, and component 1394 can be software modules executed by the processor 1385.

According to some embodiments, radar system 1302 under control of the angle resolution component 1392 can use a beam sharpening method to achieve increased angular resolution. In some embodiments, radar system 1302 can utilize techniques such as beam sharpening (e.g., horizontal beam sharpening) and de-convolution of the beam point spread function for improved angular resolution. In some embodiments, radar system 1302 can use beam sharpening as a process that improves the antenna-induced poor angular resolution (e.g., due to the beam width). There are many methods that can be used such as: Doppler Beam Sharpening, Synthetic Aperture Radar (SAR), Monopulse Radar, Sub-Aperture Radar or Split-Aperture Radar, etc. Mathematical methods, such as but not limited to centroid detection techniques and blob analysis, can be utilized to determine a center or centroid of specific radar echoes for identifying runway features or specific reflector locations. Techniques for beam sharpening are discussed in U.S. patent application Ser. Nos. 13/627,788, 12/892,563, 13/250,798, 12/236,464, and 12/167,200 and U.S. Pat. No. 8,077,078 incorporated herein by reference in their entireties.

Radar system 1302 can use radar antenna 1382 configured as a switched aperture antenna for beam sharpening. Radar system 1302 can also be configured for sequential lobing or monopulse operation to accurately estimate at which angle the target was located within the radar beam. In some embodiments, the radar beams provided by radar antenna 1382 and returns received by radar antenna 1382 associated with radar system 1302 can be separated into two or more portions and can be used to determine an angle from radar antenna 1382 to a target or a vector from the radar antenna 1382 to a target such as a runway feature. The vector can be represented as an angle (bore site angle) and range to the target. Various processes can be utilized to calculate the angle or vector to the target.

Radar system 1302 uses radar antenna 1382 that toggles between transmitting and receiving on the full aperture and transmitting on the full aperture while receiving on the partial aperture in some embodiments. These techniques can be used to accurately estimate at which angle the target was located within the radar beam and can be used to improve the accuracy of the Doppler calculations correcting for those angles. The received returns can be processed to determine a high-resolution estimate of a target angle relative to the bore site of the antenna beam. According to some embodiments, the returns can be processed using a complex conjugate multiplication method to determine the target angle. The processing can be related to sequential lobing processing but is executed in the phase domain as opposed to the common amplitude domain in some embodiments.

In some embodiments, radar system 1302 uses sequential lobing techniques where two antennas that are close to the same place may be used, going back and forth between the two antennas. An amplitude signature or phase signature that varies between the two halves of the antennas may be used to obtain data about target position for detected targets (e.g., an object such as other aircraft, terrain, towers, runway lights, and runway lights including radar reflectors such as radar reflector 608). Sequential lobing generally does not use phase comparisons with moving targets due to Doppler-induced phase changes that contaminate the phase center measurement. However, using a complex conjugate multiply method allows the Doppler-induced phase changes to be removed by cancellation. Therefore, a change in phase center between multiple different sub-apertures may be determined and used to determine angle to target.

In some embodiments, range resolution component 1390 provides higher resolution by increasing the effective waveform bandwidth of the radar system 1302. Range resolution component 1390 can use stepped-frequency compression in some embodiments. To provide higher range resolution, range resolution component 1392 can control radar system 1302 to provide ultra-wideband radar (UWB) beams (e.g., extremely narrow pulses with high power), or to provide intra pulse compression (frequency of phase modulation of the transmitted pulse) in some embodiments. Frequency coding techniques including the common linear frequency modulation (LFM) or chirp method, and discrete coded segments within the pulse can be utilized in some embodiments. Phase coding techniques including binary phase codes as well as various polyphase codes can be utilized in some embodiments. To provide higher range resolution, range resolution component 892 can control the radar system 1302 to provide interpulse pulse compression or stepped frequency compression (e.g., successive pulses with discrete increasing frequency steps) in some embodiments. In some embodiments, stepped frequency compression advantageously achieves high effective bandwidth with narrow instantaneous bandwidth. The receive bandwidth is smaller, has lower noise bandwidth, and a higher signal to noise ratio in some embodiments. Analog-to-digital sampling rates are lower (vs. pulse-compression) in some embodiments. In addition, the stepped frequency compression also has a smaller peak power (e.g., when compared to impulse), provides flexible transmit frequency control, can "hop" over restricted or undesired transmit frequencies, enables adaptive/cognitive frequency use, and rejects later received clutter from earlier transmit pulses in some embodiments. Further, the stepped frequency compression provides returns from clutter in ambiguous ranges that have frequencies that are different from returns from targets and rejects ambiguous clutter returns in the receiver IF filter of the radar system 1302 in some embodiments. Stepped frequency compression generally does not achieve range resolution with a single pulse, requires transmit, receive and processing of a group of pulses for any one bin, and has more pronounced range-Doppler coupling (e.g., different Doppler shifts for each frequency) in some embodiments.

According to one embodiment, SVS 1311 can be any electronic system or device for providing a computer-generated image of the external scene topography. The image can be from the perspective of the aircraft flight deck as derived from aircraft attitude, high-precision navigation solutions, and a database of terrain, obstacles and runway features. Generally, only those terrain, obstacle, and runway features which are contained in the current version of the SVS database are displayed in a conventional system. In some embodiments, the pilot uses the synthetic vision images as enhancements to available visual cues.

According to some embodiments, EVS 1312 can be any electronic system or device for providing a sensed image of the external scene topography. EVS 112 can be an infrared camera in one embodiment.

In some embodiments, display system 1300 combines or fuses SVS 1311 and/or the EVS 1312 with the image derived from radar data from the radar system 1302 to provide an overall image provided to the pilot according to one embodiment. In some embodiment, the image derived from the radar data are fused with HUD symbology for the displays 1302 and 1304.

Processors 1375 and 1385 can be any hardware and/or software processor or processing architecture capable of executing instructions and operating on navigational and radar data. Image merge control configuration component 862 can provide format adjustments to data.

In some embodiments, a set of reflectors 608 are shaped to produce particular return shapes, independent of radar processing by radar system 1302. Radar system 1302 can provide a pulse and receive a variable return from the set of reflectors 608 in some embodiments. The set of reflectors 608 are appropriately combined into an array or shaped to produce reflections that had angular dependence to mimic current lighting systems, which have preferential directions of illumination (e.g., the VASI and PAPI lights) in some embodiments. For example, zero or up to 4 received reflections depending on position relative to the glideslope angle can be received based upon a central, higher intensity portion of the radar return as very directed beam from reflector 608, so that radar system 1302 only detects the return if radar system 1302 is lined up for approach on the proper runway.

Figure 15:
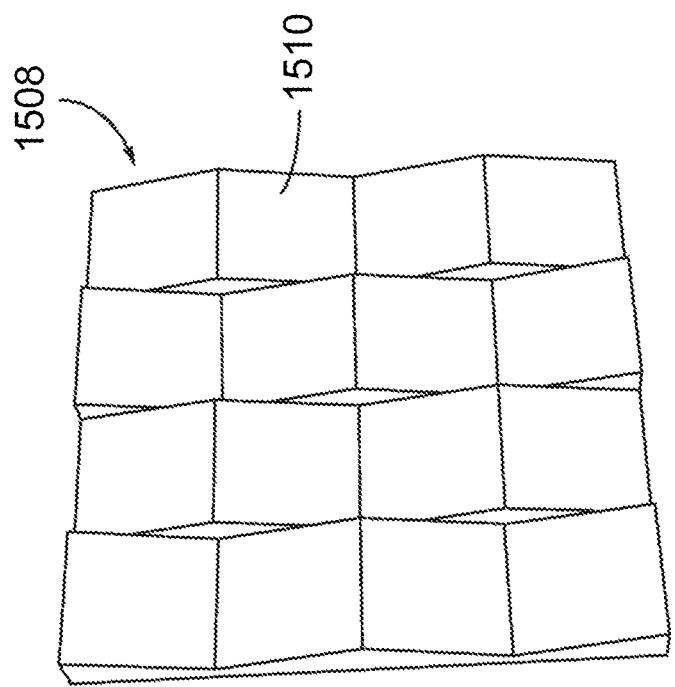
FIG. 15 is a perspective view schematic drawing of a radar reflector for use in the system illustrated in FIG. 6 according to some embodiments.
Figure 14:
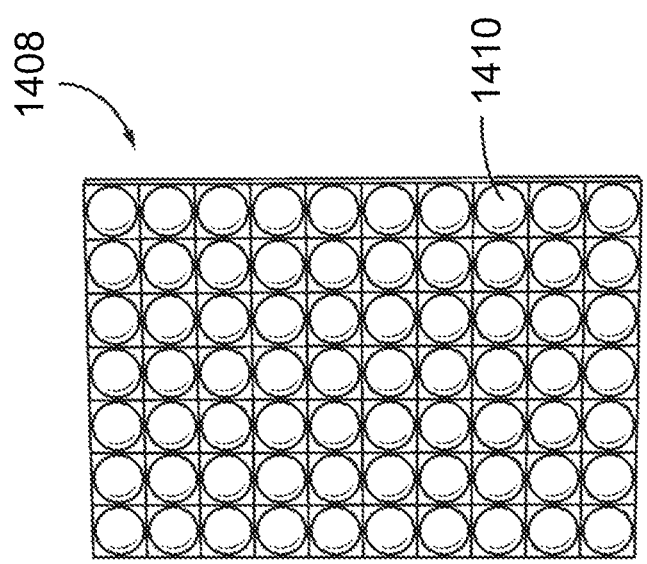
FIG. 14 is a planar top view schematic drawing of a radar reflector for use in the system illustrated in FIG. 6 according to some embodiments.
Figure 17:
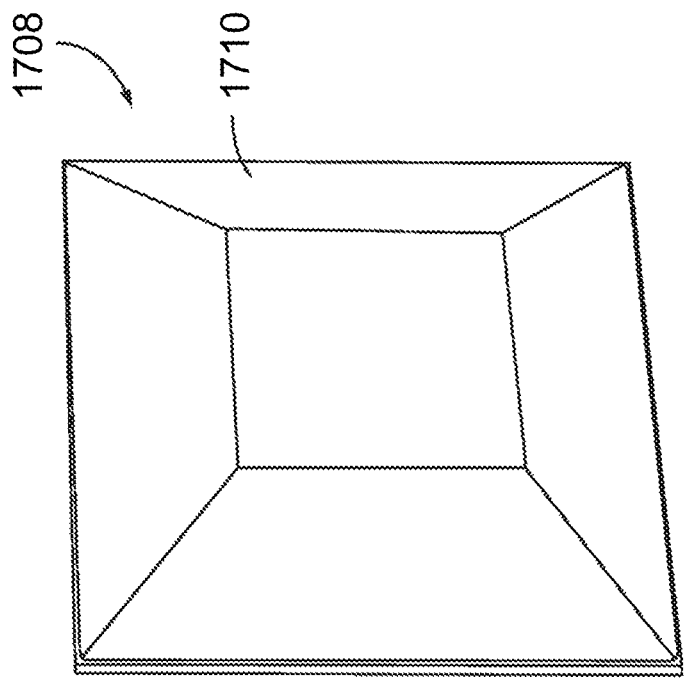
FIG. 17 is a perspective view schematic drawing of a radar reflector for use in the system illustrated in FIG. 6 according to some embodiments.
Figure 16:
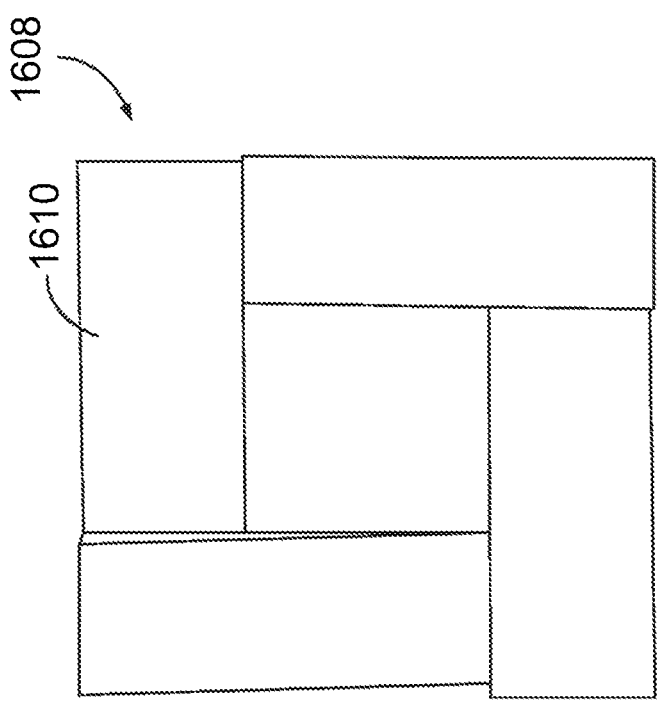
FIG. 16 is a perspective view schematic drawing of a radar reflector for use in the system illustrated in FIG. 6 according to some embodiments.
Figure 19:
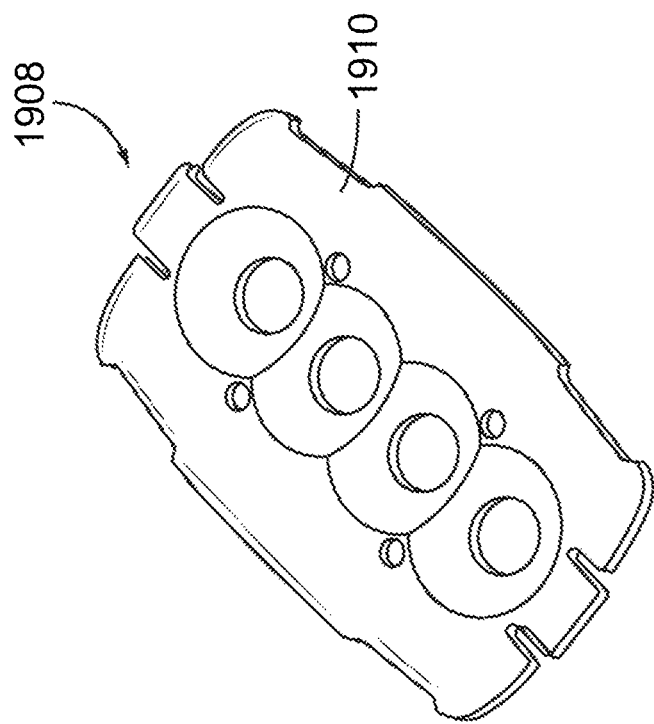
FIG. 19 is a perspective view schematic drawing of a radar reflector for use in the system illustrated in FIG. 6 according to some embodiments.
Figure 18:
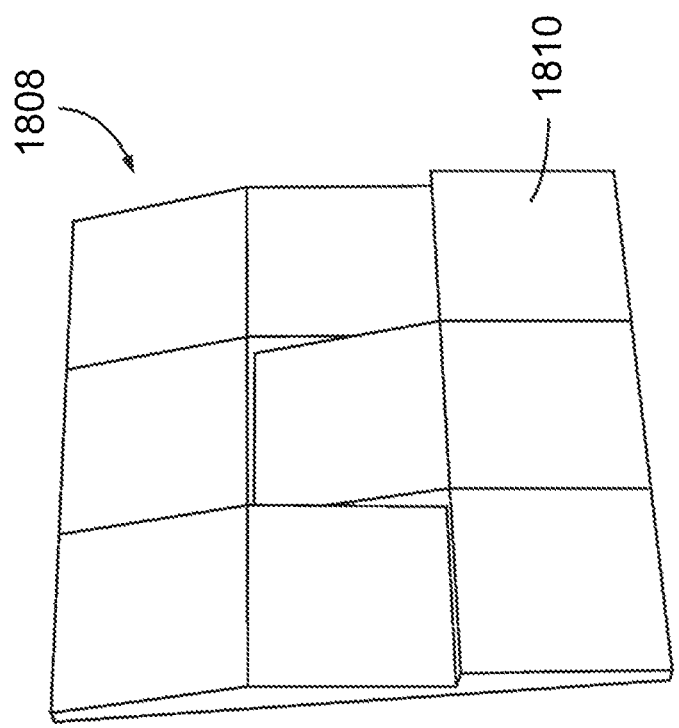
FIG. 18 is a perspective view schematic drawing of a radar reflector for use in the system illustrated in FIG. 6 according to some embodiments.

With reference to FIG. 14, a radar reflector 1408 similar to radar reflector (608, FIG. 61) includes a set of spherical surfaces 1410. With reference to FIG. 15, a radar reflector 1508 similar to radar reflector 608 includes a set of flat surfaces 1510. With reference to FIG. 16, a radar reflector 1608 similar to radar reflector 608 includes a set of flat surfaces 1610. With reference to FIG. 17, a radar reflector 1708 similar to radar reflector 608 includes a set of flat surfaces 1710. With reference to FIG. 18, a radar reflector 1808 similar to radar reflector 608 includes a set of flat surfaces 1810. With reference to FIG. 19, a radar reflector 1908 similar to radar reflector 608 includes a set of concave surfaces 1910. With reference to FIG. 20, a radar reflector 2008 similar to radar reflector 608 includes a set of flat surfaces 2010. Surfaces 2010 can be partially silvered to provide a diminished level of return. With reference to FIG. 21, a radar reflector 2108 similar to radar reflector 608 includes a set of flat surfaces 2110. Flat surfaces 2110 can include corner surfaces and be faceted at angles with respect to each other in some embodiments.

Flat surfaces 1610, 1710, 1810, 2010, and 2110 may be angled and/or shaped for providing differently shaped returns from a uniform illuminating beam in some embodiments. The angles and shapes can match airfield features that have angular dependency (PAPI, VASI, or ALS features) in some embodiments. Spherical surfaces 1410 and concave surfaces 1910 are arranged and/or shaped for providing differently shaped returns from a uniform illuminating beam in some embodiments. Surfaces 1410, 1610, 1710, 1810, 1910, 2010, and 2110 can be silvered or partially silvered. Partially silvered surfaces and lower bead densities (for surfaces 1410) can be used for partial returns.

In some embodiments, reflectors 1408, 1508, 1608, 1708, 1808, 1908, 2008, and 2108 are arranged in a set of twelve reflectors. The set can be arranged such that the set returns a full signal for two reflectors and a diminished signal for two reflectors (e.g., to indicate two red symbols and two white symbols for PAPI/VASI indications) when radar system 1302 is within the glide scope. The set can also be arranged such that the set returns four full signals when radar system 1302 is below the glide scope (e.g., four reflectors could be aimed low to indicate red symbols for PAPI/VASI indications symbolizing a danger condition). The set can also be arranged to return four diminished signals when radar system 1302 is above the glide scope (e.g., partial reflectors could be aimed low to indicate white symbols for PAPI/VASI indications).

Inexpensive reflectors can use silvered plastic beads of appropriate shape (e.g., conical section) embedded in a plastic sheet. In some embodiments, twenty five percent of the sheet area with beads provides a partial reflector, while one hundred percent of sheet area with beads provides a full reflector.

In some embodiments, the weather radar system 1302 may operate in a weather sense mode until approach or landing. During approach or landing, the weather radar system 1302 alternatively performs radar data gathering for sensing of the external surroundings, radar data gathering for weather sensing, and radar data gathering for wind shear detection. In some embodiments, during approach or landing, the weather radar system 1302 alternatively performs radar data gathering for sensing of external surroundings including radar reflectors 608, and radar data gathering for wind shear detection or other hazard detection. During approach or landing, weather radar system 1302 alternatively performs radar data gathering for sensing of external surroundings, and radar data gathering for weather sensing in some embodiments. In some embodiments, weather sensing operations are suspended during approach and landing.

Referring now to FIGS. 22A through 22D, the method 2200 may be implemented by the FMS 200, the radar systems 206, 602, 1302, and the flight displays 102 and may include the following steps.

Figure 22A:
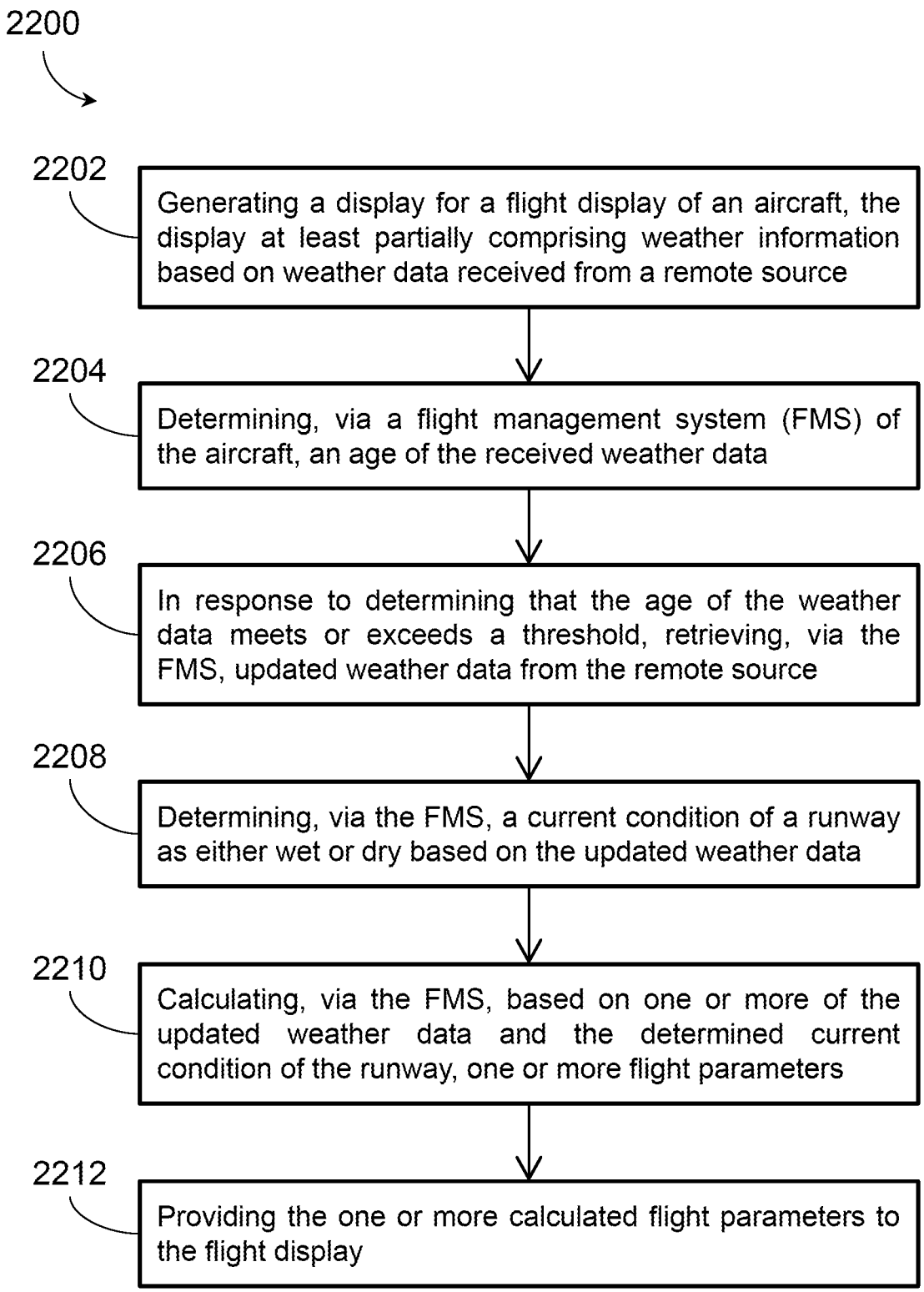

At a step 2202, referring to FIG. 22A, the flight display generates a display including weather information based on weather data received from a remote source.

At a step 2204, the FMS determines the age of the weather data.

At a step 2206, if the weather data is sufficiently old (e.g., meets or exceeds an age threshold), the FMS retrieves updated or current weather data from the remote source.

At a step 2208, based on the updated weather data, the FMS determines whether the condition of the runway (to which the aircraft is on approach or at which the aircraft is preparing to land) is wet or dry.

At a step 2210, the FMS calculates flight parameters based on the updated weather data and/or the current runway condition. For example, the calculated flight parameters may relate to an approach path to the runway or to a landing sequence of the aircraft. The flight parameters may include, but are not limited to, an approach V-Speed or a minimum landing distance for the aircraft based on a characteristic of the aircraft.

At a step 2212, the FMS provides the flight parameters to the flight display.

Referring now to FIG. 22B, the method 2200 may include an additional step 2214. At the step 2214, the FMS receives user input relating to a request from the pilot or operator for the updated weather data, the user input provided via a touch upon the touchscreen (e.g., haptic input).

Referring now to FIG. 22C, the method 2200 may include an additional step 2216. At the step 2216, the FMS directs the flight display to display an alert indicating the age of the weather data (i.e., when the age of the weather data meets or exceeds the age threshold).

Referring now to FIG. 22D, the method 2200 may include additional steps 2218, 2220, and 2222.

At the step 2218, the radar system receives radar returns from radar reflectors associated with an approach lighting system of the runway.

At the step 2220, the radar system processes the received radar returns to determine that the approach path of the aircraft is within an angular boundary.

At the step 2222, the radar system provides image data for display by the flight display, the image display indicative of the runway (e.g., runway structures) or of the approach lighting system (e.g., visual approach slope indications (VASI), precision approach path indications (PAR).

CONCLUSION

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

As noted above, embodiments within the scope of the inventive concepts disclosed herein include program products comprising non-transitory machine-readable media for carrying or having machine-executable instructions or data structures stored thereon. Such machine-readable media may be any available media that may be accessed by a computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a computer or other machine with a processor. Thus, any such a connection is properly termed a machine-readable medium. Combinations of the above are also included within the scope of machine-readable media. Machine-executable instructions comprise, for example, instructions and data which cause processor to perform a certain function or group of functions.

Embodiments in the inventive concepts disclosed herein have been described in the general context of method steps which may be implemented in one embodiment by a program product including machine-executable instructions, such as program code, for example in the form of program components executed by machines in networked environments. Generally, program components include routines, programs, objects, components, data structures, etc. that perform particular tasks or implement particular abstract data types. Machine-executable instructions, associated data structures, and program components represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program components may be located in both local and remote memory storage devices.

The database or system memory may include read only memory (ROM) and random-access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program components and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

We claim:

1. A method for assisting an aircraft in a landing process, the method comprising:
    generating a display for a flight display of an aircraft, the display at least partially comprising weather information based on weather data received from a remote source;
    determining, via a flight management system (FMS) of the aircraft, an age of the received weather data;
    in response to determining that the age of the weather data meets or exceeds a threshold, retrieving, via the FMS, updated weather data from the remote source;
    determining, via the FMS, a current condition of a runway as either wet or dry based on the updated weather data;
    calculating, via the FMS, based on one or more of the updated weather data and the determined current condition of the runway, one or more flight parameters; and
    providing the one or more calculated flight parameters to the flight display.

2. The method of claim 1, wherein the flight display comprises a touchscreen, the method further comprising:
    receiving a user input comprising a touch on the touchscreen, the user input relating to a request for the updated weather data.

3. The method of claim 1, wherein the age of the weather data comprises a timestamp, the method further comprising:
    causing an alert to be displayed on the flight display in response to the age of the weather data meeting or exceeding the threshold, the alert indicating the age of the weather data.

4. The method of claim 1, wherein the weather data comprises one or more of:
    a temperature, dew point, pressure, wind speed and direction, visibility, ceiling, precipitation, or cloud cover.

5. The method of claim 1, wherein the one or more flight parameters relate to at least one of an approach path to the runway or a landing sequence of the aircraft comprise at least one approach V-Speed and a minimum landing distance for the aircraft based on a characteristic of the aircraft.

6. The method of claim 5, further comprising:
    receiving, via a radar system of the aircraft, one or more radar returns from one or more radar reflectors of an approach lighting system associated with the runway;
    determining, via the radar system, that the approach path is within an angular boundary by processing the one or more radar returns;
    and
    providing to the flight display image data associated with the one or more radar returns, the image data indicative of one or more of the runway or the approach lighting system.

7. The method of claim 1, wherein providing the one or more calculated flight parameters to the flight display includes:
    providing the updated weather data to the flight display.

8. The method of claim 1, wherein providing the one or more calculated flight parameters to the flight display includes:
    providing the current condition of the runway to the flight display.

* * * * *